United States Patent Office

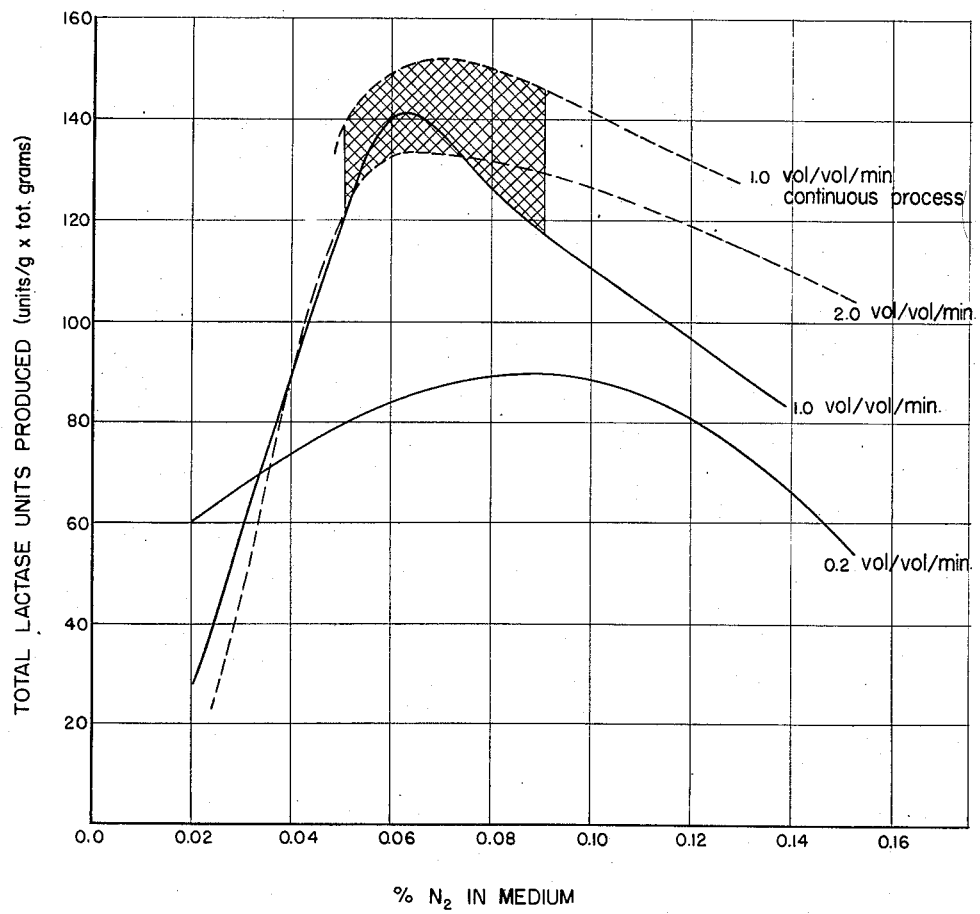

2,776,928
Patented Jan. 8, 1957

2,776,928

PRODUCTION OF SACCHAROMYCES FRAGILIS WITH AN OPTIMUM YIELD OF LACTASE

Harold Young, Babylon, and Raymond P. Healey, North Babylon, N. Y., assignors to National Dairy Research Laboratories, Inc., Oakdale, N. Y., a corporation of Delaware Application May 23, 1955, Serial No. 510,167

4 Claims. (Cl. 195—67)

This invention relates to a process for influencing the growth of *Saccharomyces fragilis* to induce it to produce a maximum yield of lactase enzyme.

It is well known that *Saccharomyces fragilis* produces lactase enzyme, but the conditions influencing the production of lactase enzyme have not been described in the literature, and apparently are unknown. There are many procedures which are employed to grow *Saccharomyces fragilis*. However, these procedures are usually directed to the production of a maximum yield of yeast cells, or of vitamins. A maximum yield of the yeast and/or of vitamins does not necessarily result in a maximum yield of lactase enzyme, inasmuch as the amounts of lactase produced by the yeast are known to vary greatly under such conditions. For example, U. S. Patent No. 2,128,845 to Myers and Weisberg and Graham et al., Canadian Journal of Technology, 31 109–113 (1953) describe methods of growing lactose-fermenting yeast in which whey or other dairy products are used as a nutrient medium providing a source of lactose. However, these processes are concerned primarily with the production of a vitamin containing food or feed materal, and the conditions are not correlated with the conditions influencing a maximum production of lactase enzyme. In fact, the conditions described in these references are not satisfactory for the commercial production of lactase enzyme.

In accordance with the invention, a process is provided which is capable of producing yields of lactase in excess of 130 units per gram of lactase yeast. These high yields are obtained by maintaining the nitrogen content of the nutrient medium and the rate of aeration within closely controlled limits.

The limits of available nitrogen content of the nutrient medium and of the rate of aeration are defined in the shaded area of Figure 1 of the attached drawing. This shows graphically the yield of lactase obtained in terms of the available nitrogen concentration of the nutrient medium, at several levels of aeration. The drawing shows that the yield of lactase is at a maximum, in excess of 130 units, at 0.06% nitrogen, and decreases rapidly as the nitrogen concentration is either increased or decreased. The suggested outside limits of nitrogen concentration are 0.055 to 0.85%, and these ranges surprisingly obtain at rates of aeration of from 1 to 2 volumes per volume of medium per minute. These figures apply to batch operations. In a continuous operation, better yields are obtained but the optimum still is had at a nitrogen content of 0.06%, and the minimum is still at 0.055%.

At aeration rates below 1 volume per volume per minute, the yield of lactase decreases, sharply. Rates of aeration higher than 2 volume per volume per minute do not give an appreciable increase in the yield and the difficulties caused by foaming and excessively violent agitaton of the nutrient medium make their use undesirable.

Lactase activity in accordance with the invention is measured in lactase units, which are defined as the number of grams of lactose which is hydrolyzed by one gram of the lactase yeast in concentrated skim milk of 30% solids at 123° F., pH 6.8, for four hours. Lactase activity thus is directly proportional to the amount of lactase present. It is apparent that the relationship between available nitrogen content and the aeration rate is quite critical in terms of lactase activity of the yeast obtained.

So far as is known, these conditions are applicable only to *Saccharomyces fragilis*. *Torula utilis* has been shown by Singh et al., Archives of Biochemistry 18, pages 181–193 (1948) not to be susceptible to variations in the aeration rate and nitrogen content. Under a wide range of conditions the author has noted no effect on protein content due to aeration.

The ingredients and proportions thereof essential to any nutrient medium employed for the propagation of yeast, and particularly yeast of the above strain, are well known to those skilled in the art and details thereof need not be given here. It is important, however, that nutrient media employed in accordance with the present invention contain lactose as the chief source of carbohydrate in an amount within the range from 0.5 to 5%. The total solids content of the nutrient medium should be between about 2 and about 10%, preferably 6%, and its pH should be approximately 4.5, but a satisfactory enzyme preparation can be obtained employing a nutrient medium whose pH lies within the range of 3.5 to 7.5.

The nutrient medium can be prepared synthetically by dissolving in water lactose, some source of inorganic nitrogen, such as urea, ammonia, or diammonium phosphate, and the other required yeast nturient materials. Usually it is more convenient, however, and least expensive, to employ as a basis for the medium a natural product which contains all of a large proportion of the materials required for yeast growth, and to supply nutrients in which the material may be deficient. Well known materials in plentiful supply which contain all yeast nutrient requirements, except possibly inorganic nitrogen, are whey derived from cheese or casein manufacture and the mother liquor wash water obtained as a waste product in the production of lactose from whey or milk products.

It has been determined previously that the nutrient medium should be pasteurized before the yeast is added thereto. Pasteurization can be effected by heating the medium at 140 to 160° F. for 30 minutes or longer, or 165° F. for 30 minutes, or at 180° F. to 185° F. or higher for 10 to 30 seconds.

When whey is employed as the yeast nutrient medium in the process of the invention, it is usually heated first from 0.5 to 2 minutes at 175° F. to 185° F. to pasteurize it, and then held at temperatures between 145° F. and 160° F. for periods ranging from 0.5 to 10 hours, depending on how soon it is to be used in the fermentation process. This elevated holding temperature prevents spoilage and incidentally tends to cause, desirably, the coagulation of most of the whey protein. If approximately 10% of the solution is removed from the bottom of the tank, most of the protein will be eliminated and the supernatant liquid may then be processed in the usual way. The pH can be adjusted either by addition of lactic or mineral acid or by inoculation with lactic acid-producing bacteria before pasteurization.

While the whey is kept at an elevated temperature, it is fortified with such additional yeast nutrient material as may be required. It is desirable to add these materials at pasteurization temperature in order to destroy bacteria contained therein. A source of inorganic nitrogen can be added, if necessary to bring the available nitrogen content to within the limits defined by the shaded area of the drawing, according to the aeration rate to be employed. Aqua ammonia is the preferred source of nitrogen for economic reasons, ease of handling and freedom from ash constituents, although other known sources of nitrogen such as urea and diammonium phosphate may be used, if desired. Also, if desired, 0.1% corn steep liquor can be added.

The whey in its natural state contains a certain amount of available nitrogen and this nitrogen content is included in computing the total available nitrogen within the shaded area of the drawing. It is unnecessary to add a source of nitrogen if the whey initially contains sufficient available nitrogen for the purposes of the invention.

The solids content of the whey can then be adjusted to within the range from 2% to 8%. Dependent upon the initial solids content, this can be accomplished by fortifying either with additional solids or concentrated nutrient material, or by dilution with water or with a solution of the added nutrient material.

Before addition of yeast the nutrient medium is brought to a propagation temperature within the range of 80° F. to 100° F., preferably about 86° F. An actively growing starter culture of the yeast in the nutrient medium is added so that the starting fermentation medium contains a cell count of about 500 million to 1 billion yeast cells per ml.

After the inoculation of the medium, the fermentation is begun by aerating the nutrient medium at a rate such that the process is carried out under conditions of aeration and available nitrogen concentration within the shaded area of the drawing. This means that the aeration rate will range from approximately 1 volume per volume per minute to about 2 volumes per volume per minute, depending on the available nitrogen content of the medium. Specially designed sparger systems are commercially available and are ideally suited to the type of aeration employed in the invention.

The process may be operated as either a batch process or a continuous process; the latter type of process is particularly desirable from a commercial point of view. In a continuous process, the nutrient medium is the same as used in the batch process and preferably is derived from whey. In the operation of the continuous process, nutrient medium is fed to the fermentation at a constant rate to replenish exhausted nutrients while fermented nutrient medium is withdrawn at a similar constant rate for the harvesting of yeast. In practice the nutrient material is inoculated with concentrated yeast slurry in an amount equal to about 500 million to 1 billion yeast cells per cc. of the medium, and these cells are encouraged to grow at a maximum rate under the optimum growth favoring conditions hereinabove outlined. In this manner, it is possible to establish a continuous fermentation proceess in which the yield of yeast is at least five times that of a batch process under similar growth-favoring conditions.

Highly-active lactase yeast is harvested from the withdrawn liquor continuously or from time to time as desired. The spent liquor from which the yeast has been harvested may be fortified with nutrients and reused.

The lactase-active yeast is usually intended to be used in the hydrolysis of lactose to glucose and galactose. It is therefore essential that lactase be uncontaminated with those yeast enzyme systems which convert glucose and galactose to carbon dioxide and alcohol. These enzyme systems are collectively called "zymase" by the art, and it will be understood that yeast lactase preparations of the invention must be zymase-inactive if conversion of glucose and galactose to carbon dioxide and alcohol is to to prevented.

The zymase may be destroyed without destroying the lactase by drying the yeast under carefully controlled conditions or by plasmolyzing the yeast with an organic solvent. In the preparation of a commercial lactase-active zymase inactive enzyme preparation in marketable form it is desirable to dry the yeast, and this method of inactivation is therefore preferred. Two such processes for inactivating zymase without inactivating lactase are disclosed, one in Edwin G. Stimpson U. S. Patent No. 2,693,440, and one in the copending application to Roberts P. Myers, Serial No. 346,025, filed March 31, 1953.

In order to illustrate the invention and the advantages thereof, the following examples are presented.

EXAMPLES 1 TO 6

These examples study two variables, aeration rate and nitrogen concentration, and furnish the data upon which the drawing is based.

A quantity of cheddar cheese whey was deproteinated conventionally by coagulating whey protein by the addition of lactic acid. To individual portions of the deproteinated whey, numbered as the examples, there was added varying levels of $NH_3$ (as aqua ammonia $NH_4OH$) to raise the available nitrogen content of the portions to different levels. The deproteinated whey initially contained about 0.021% of available nitrogen.

The pH of individual portions of nitrogen-fortified whey was adjusted to 4.5 with lactic acid, the medium heated to 86° F., inoculated with *S. fragilis* and fermented in a batch process, using various levels of aeration. All fermentations were continued until substantially all of the lactose in the whey was consumed. The yeast was then recovered by centrifugation and zymase was selectively inactivated by freeze drying (lyophilization). The results are shown in the following table:

Table I.—The effect of soluble nitrogen and aeration rate on lactase production by S. Fragilis

| Ex. No. | Percent $NH^3$ Added | Percent Available Nitrogen in Medium | Yield of Yeast/Liter, Grams | | | Lactase Units/Gram of Cells, Grams | | | Total Lactase Units/Gram × Yield in Grams = Total Units Produced/Liter | | | |
|---|---|---|---|---|---|---|---|---|---|---|---|---|
| | | | 0.2 v./v./min. | 1.0 v./v./min. | 2.0 v./v./min. | 0.2 v./v./min. | 1.0 v./v./min. | 2.0 v./v./min. | Percent $N^2$ | 0.2 v./v./min. | 1.0 v./v./min. | 2.0 v./v./min. |
| 1 | 0.0 | 0.0210 | 2.7 | 3.4 | 3.1 | 22.0 | 7.2 | 8.8 | 0.0210 | 59 | 27 | 27 |
| 2 | 0.05 | 0.0312 | 2.9 | 3.7 | 4.6 | 22.8 | 17.2 | 8.4 | 0.0312 | 63 | 63 | 39 |
| 3 | 0.10 | 0.0430 | 2.9 | 4.7 | 4.8 | 29.2 | 21.2 | 21.2 | 0.0430 | 76 | 100 | 102 |
| 4 | 0.20 | 0.0610 | 3.0 | 4.8 | 5.0 | 28.8 | 29.6 | 27.2 | 0.0610 | 85. | 142 | 134 |
| 5 | 0.40 | 0.1090 | 3.2 | 5.1 | 5.7 | 27.6 | 20.8 | 16.4 | 0.1090 | 88 | 107 | 104 |
| 6 | 0.60 | 0.1530 | 3.0 | 4.0 | 5.0 | 18.8 | 18.8 | 20.8 | 0.1530 | 54 | 74 | 104 |

Lactase units=number of grams of lactose hydrolyzed by 1 gram of yeast at 123° F., pH 6.8 after 4 hours using concentrated skim milk (30% solids) as the lactose carrier.

These data show the importance of aeration rate and nitrogen content of the medium in the production of lactase enzyme. Examples 1, 2 and 3 show that increased aeration alone results in yeast of low lactase activity, and Examples 5 and 6 show that high nitrogen content is not enough, either. Example 4 shows that at a nitrogen level of about 0.06% and aeration of 1 to 2 vol./vol./min. a large yield of yeast containing 134 to 142 units/l. of lastase can be produced.

EXAMPLES 7 TO 9

A highly potent lactase enzyme preparation was prepared by a continuous process as follows:

Three thousand gallons of whole cheddar cheese whey (acidity 0.80%) as lactic acid was pasteurized at 180° F. for approximately four hours. The whey was then pumped to the fermentor, and to this was added 0.16% aqua ammonia (57% NH$_4$OH containing 27% NH$_3$) and the final pH adjusted to 4.5. The total available nitrogen content was determined to be 0.048%. The medium was then cooled to 86° F. and sufficient *Saccharomyces fragilis* yeast inoculum was added to result in a starting yeast cell count in the range of 5 to 7 × 10$^8$ cell/ml.

Aeration was started at 1.2 volumes of air/volume of liquid/minute or 500 cubic feet/minute. The cells were allowed to propagate until the yeast cell count had increased to 1.0 to 1.5 × 10$^9$ yeast cells/ml. and the lactose concentration in the whey medium had decreased to 0.50 to 0.25%. At this point, feeding of whole pasteurized whey fortified with 0.16% aqua ammonia was begun at a rate of ¼ of the total volume in the fermentor per hour, and gradually increased along with aeration rate to compensate for the increase in volume in the fermentor. When the fermentor contained 6,000 gallons and the feed rate was 1500 gallons/hour, fermented whey was withdrawn at 1500 gallons/hour (or at a rate equal to the feed rate). This fermentation process (feeding and withdrawing) continued until 20,000 to 24,000 gallons of whey had been fermented. The fermented whey was then passed through a DeLaval yeast separator and the yeast cream, after separation, was spray dried to inactivate the zymase. The lactase activity was determined on the spray dried product.

Eight runs were made at the 0.15% aqua ammonia level, 5 runs at a level of 0.26% and 5 runs at a level of 0.39%.

Table II gives the results of the runs and the average lactase activity of the cells produced.

skimmilk is adjusted to 123° F. Yeast lactase, prepared as set forth above, is dispersed in four times its weight of water to form a slurry, and this slurry is added to the skimmilk in a ratio of one part by weight yeast lactase to each fifty parts by weight of lactose in the skimmilk. During addition of the lactase slurry the skimmilk is agitated vigorously. The mixture is then held at 123° F. for four hours, at the end of which time 80 to 90% of the lactose has been converted to glucose and galactose. In order to inactivate the lactase enzyme, the mixture is heated at 160° F. for 30 minutes. The product is cooled and may be frozen and stored at 0° F., or it may be dried by any convenient method, such as in a roll or spray drier.

The dried product may be used to prepare an ice cream or a process cheese.

All parts and percentages in the specification and claims are by weight unless otherwise indicated. Percentages of components of the nutrient medium are by weight of the nutrient medium.

We claim:

1. In a process for producing a lactase-active enzyme preparation by propagating *Saccharomyces fragilis* under growth-favoring conditions in a nutrient medium, the improvement which comprises maintaining the available nitrogen content and the rate of aeration within the shaded area of Figure 1.

2. A process according to claim 1 in which the nutrient medium comprises whey.

3. A process according to claim 1 which is operated continuously with introduction of fresh nutrient medium and withdrawal of fermented liquor.

4. A process according to claim 1 in which the available nitrogen content of the nutrient medium is provided at least in part by ammonia.

Table II.—*The effect of soluble nitrogen on the lactase activity of S. Frigillis produced by a continuous fermentation system*

| Example No. | Run No. | Percent Aqua Ammonia Added | Percent Available Nitrogen | Lactase Units | Average Lactase Units | Lactase Units Total | Lactase Units Units/l. |
|---|---|---|---|---|---|---|---|
| 7 | 1 | 0.16 | 0.048 | 22.0–20.0 | 27.3 | 814 | 133.2 |
|   | 2 | 0.16 | 0.048 | 28.0 |   |   |   |
|   | 3 | 0.16 | 0.048 | 28.0 |   |   |   |
|   | 4 | 0.16 | 0.048 | 28.0 |   |   |   |
|   | 5 | 0.16 | 0.048 | 31.2 |   |   |   |
|   | 6 | 0.16 | 0.048 | 28.0–31.2 |   |   |   |
|   | 7 | 0.16 | 0.048 | 27.2 |   |   |   |
|   | 8 | 0.26 | 0.0784 | 31.2 |   |   |   |
| 8 | 9 | 0.26 | 0.0784 | 33.6–36.0 | 30.6 | 957 | 149.3 |
|   | 10 | 0.26 | 0.0784 | 32.0 |   |   |   |
|   | 11 | 0.26 | 0.0784 | 28.0–32.0–24.0 |   |   |   |
|   | 12 | 0.26 | 0.0784 | 28.0 |   |   |   |
|   | 13 | 0.39 | 0.1050 | 28.0 |   |   |   |
| 9 | 14 | 0.39 | 0.1050 | 28.0–28.8 | 29.6 | 429 | 142.0 |
|   | 15 | 0.39 | 0.1050 | 31.2–32.0 |   |   |   |
|   | 16 | 0.39 | 0.1050 | 31.2 |   |   |   |
|   | 17 | 0.39 | 0.1050 | 27.2 |   |   |   |

From a comparison of Examples 7, 8 and 9 it can be observed that good lactase activity is achieved when the available nitrogen is within the shaded area of the drawing. The optimum appears to be in the range of 0.28% NH$_3$ (or 0.0830% N$_2$) available.

The following shows the utility of this lactase enzyme preparation:

Raw whole milk, suitable for human use, is separated, and the resulting skimmilk pasteurized at 160° F. for 30 minutes, then condensed in vacuo at a low temperature to a 30% solids content. The temperature of the condensed References Cited in the file of this patent

UNITED STATES PATENTS

| 2,199,722 | De Becze | May 7, 1940 |
| 2,715,601 | Morgan | Aug. 16, 1955 |

FOREIGN PATENTS

| 474,822 | Great Britain | of 1936 |

OTHER REFERENCES

Dienert: Comptes Rendus 129 (1899), pages 63–64.